US009157666B2

United States Patent
Freitag et al.

(10) Patent No.: US 9,157,666 B2
(45) Date of Patent: Oct. 13, 2015

(54) GROUND HEAT EXCHANGE PROCESSES AND EQUIPMENT

(71) Applicant: BRAUN INTERTEC GEOTHERMAL, LLC, Minneapolis, MN (US)

(72) Inventors: Scott Freitag, Minneapolis, MN (US); Kelton Douglas Leighton Barr, Minneapolis, MN (US)

(73) Assignee: Braun Intertec Geothermal, LLC, Minneapolis, MN (US)

( * ) Notice: Subject to any disclaimer, the term of this patent is extended or adjusted under 35 U.S.C. 154(b) by 183 days.

(21) Appl. No.: 13/913,132

(22) Filed: Jun. 7, 2013

(65) Prior Publication Data

US 2013/0327498 A1    Dec. 12, 2013

Related U.S. Application Data (60) Provisional application No. 61/656,763, filed on Jun. 7, 2012.

(51) Int. Cl.
  *E21B 33/10* (2006.01)
  *F24J 3/08* (2006.01)

(52) U.S. Cl.
  CPC *F24J 3/081* (2013.01); *F24J 3/086* (2013.01); *Y02E 10/12* (2013.01); *Y02E 10/16* (2013.01)

(58) Field of Classification Search
  USPC ............................................. 165/45
  See application file for complete search history.

(56) References Cited

U.S. PATENT DOCUMENTS

| 6,212,896 B1 | 4/2001 | Genung |
| 2011/0308268 A1 | 12/2011 | Krimsky |

FOREIGN PATENT DOCUMENTS

| DE | 102011102485 A1 | 11/2012 |
| WO | 9845009 A2 | 10/1998 |
| WO | WO 9845009 A2 * | 10/1998 |
| WO | 0036343 A1 | 6/2000 |
| WO | 0037862 A1 | 6/2000 |
| WO | 2010053424 A1 | 5/2010 |
| WO | 2012000009 A1 | 1/2012 |

OTHER PUBLICATIONS

International Search Report and Written Opinion for corresponding International Application No. PCT/US2013/044798, mailed May 8, 2014, 10 pages.
Notification of Transmittal of International Preliminary Report on Patentability of PCT/US13/44798 dated Feb. 15, 2015, 7 pages, International Preliminary Examining Authority, U.S. Office, Alexandria, Virginia.

* cited by examiner

*Primary Examiner* — David Bagnell
*Assistant Examiner* — Ronald Runyan
(74) *Attorney, Agent, or Firm* — Fredrikson & Byron P.A.

(57) ABSTRACT

Equipment and processes for ground heat exchange are disclosed. Embodiments of the ground heat exchange system may comprise a geothermal well that includes an inner tube positioned coaxially inside a borehole in geologic units, a substantially-liquid impermeable outer liner sealed at the bottom, and a liquid supply system. The outer liner may include one or more layers of a substantially-liquid impermeable fabric or coating. A fluid such as water is supplied by the liquid supply system and flows co-axially through the inner tube. The fluid pressure in the annulus between the inner tube and the outer liner presses the outer liner against the borehole wall, providing sealing contact and preventing interconnection of aquifers of the geologic units.

20 Claims, 7 Drawing Sheets

Fig. 1

(PRIOR ART)

Fig. 2

(PRIOR ART)

GROUND HEAT EXCHANGE PROCESSES AND EQUIPMENT

This application claims priority to provisional application U.S. Ser. No. 61/656,763 filed Jun. 7, 2012, the disclosure of which is hereby incorporated by reference herein in its entirety.

TECHNICAL FIELD

This disclosure relates to ground heat exchange systems.

BACKGROUND

Thermal energy in the ground is commonly used for heat exchange processes. Below a certain depth (e.g., 30 feet), the underground temperature consistently approximates the average annual temperature. The underground temperature generally does not vary based on the season. Thus, in warmer seasons, the underground region can serve as a heat sink, while in colder seasons, the underground region can serve as a heat source. Fluid (e.g., water) can be directed underground to either shed heat or extract heat. The fluid can then be directed back above ground for various heating/cooling purposes. Such ground heat exchange systems are becoming more common and cost-effective. Traditionally, up-front costs associated with digging wells and installing equipment have served as significant impediments to the large-scale adoption of geothermal heat exchange systems. Once installed, however, such systems can considerably reduce ongoing energy costs, but the large up-front costs can result in long payback periods.

Ground heat exchange systems sometimes include a borehole located in geologic units, a tube, a heat-exchange fluid that flows down through the annulus between the borehole and the tube and back up inside the tube. Such configurations are referred to as an open-loop ground heat exchange system as the fluid can mix with the surrounding aquifers as it travels down the annulus between the borehole and the inner tube. When a borehole encounters multiple aquifers in surrounding geologic units, the open-loop ground heat exchange system can allow the aquifers to interconnect. In many instances, regulations prohibit the interconnection of aquifers.

Alternate embodiments of ground heat exchangers may have a closed-loop configuration. In this configuration, no external fluid is introduced into the system. In such closed-loop configurations, filtration is not necessary because the fluid does not mix with the surrounding aquifers. In addition, in some embodiments, inhibitors and/or antifreeze may be added to the fluid to enhance heat transfer without such inhibitors and/or antifreeze mixing with the underground water.

SUMMARY

This disclosure generally relates to equipment and processes that may be used for ground heat exchange that prevent interconnection of aquifers. In certain embodiments, the ground heat exchange system comprises a geothermal well. The geothermal well may include an inner tube positioned co-axially inside a borehole in geologic units, a substantially-liquid impermeable outer liner sealed at the bottom, and a liquid supply system. The inner tube may have a substantially high thermal resistance or be thermally insulative. Filtration systems may be provided in some embodiments at the bottom of the inner tube. The outer liner may include one or more layers of a substantially-liquid impermeable fabric or coating. A fluid such as water is supplied by the liquid supply system and flows co-axially through the inner tube.

The fluid pressure in the annulus between the inner tube and the outer liner presses the outer liner against the borehole wall, providing sealing contact and preventing interconnection of aquifers of the geologic units. The radially outwardly directed hydraulic pressure provided by the liquid in the annulus can press the outer liner into the cracks and crevices of the borehole wall to create a tight seal and inhibit liquid from seeping past the liner through such cracks and crevices. In some embodiments, an outer tube made of a polymeric material is placed in the borehole, and filling the annulus between the outer tube and the borehole with a filler material, such as cement, bentonite grout or similar material.

Examples disclosed in this disclosure may provide one or more advantages over existing equipment and methods used in ground heat exchange. For example, embodiments of the present invention can prevent interconnection of aquifers. The closed-loop configuration can permit very efficient heat exchange. Embodiments that include an outer tube made of polymeric material may broaden the applicability of the closed-loop, coaxial flow ground heat exchanger to locations that have thick layers of unconsolidated geologic materials overlying bedrock. Ground heat exchange systems with an outer liner made of a substantially liquid-impermeable fabric may not need filler material such as cement or bentonite grout to prevent interconnection of aquifers, which can be thermally insulating and inhibit effective heat exchange. The absence of filler material may prevent its migration into the aquifers that the borehole intersects, thereby preventing the plugging of the aquifers' permeable features. Higher efficiency of some embodiments allows its application as a heating/cooling source to use fewer boreholes.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
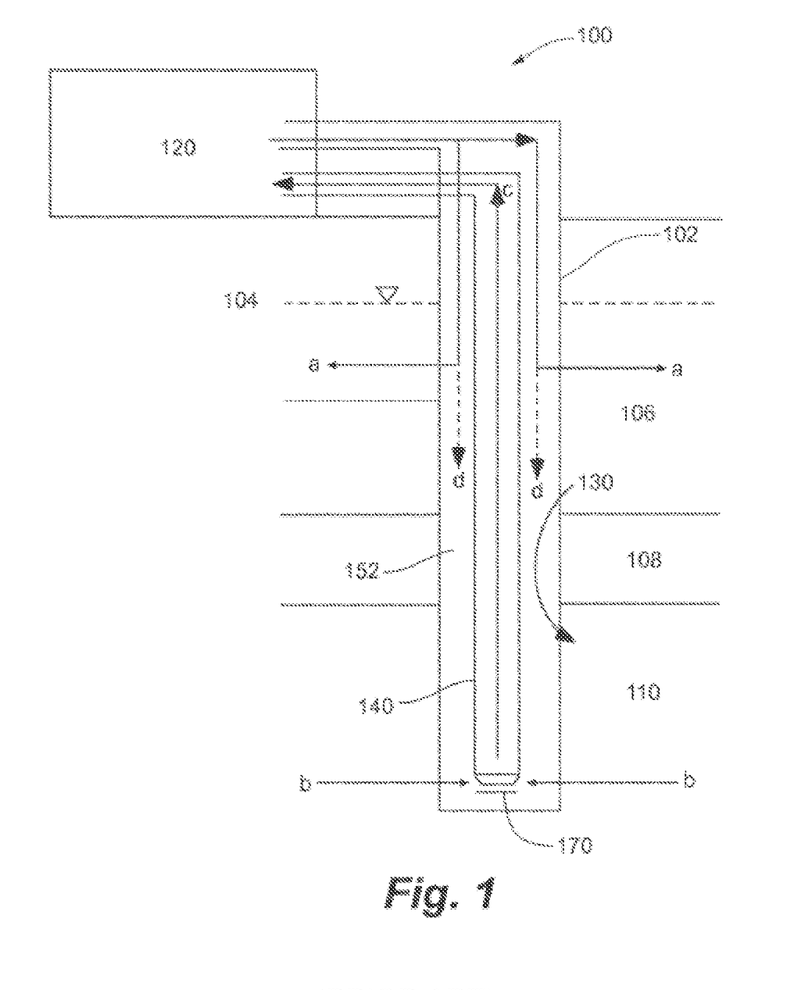
FIG. 1 is a schematic diagram of a conventional standing column well ground heat exchanger.

FIG. 1 shows an illustrative ground heat exchanger 100, often referred to as a standing column well that deploys geothermal energy to heat or cool indoor spaces. A liquid supply system 120 is connected to the ground heat exchanger 100. In many embodiments, the liquid supply system 120 may be a heating/cooling system to heat or cool indoor spaces. In some embodiments, the liquid supply system 120 may include a thermal storage device to provide off-peak electricity at a lower cost by storing thermal energy available from intermittent sources such as solar energy. Such thermal storage devices traditionally employ ground heat exchange systems to maintain a constant liquid temperature in order to balance energy demand between day and night or seasonally between summer and winter. Some embodiments may include other suitable liquid supply systems. A borehole 102 may be drilled through unconsolidated geologic units (e.g., soil and weathered rock), which may also be called overburden. The borehole 102 may then be extended further into the underlying consolidated geologic units, which may also be called bedrock. In certain geographic regions, this bedrock portion of the borehole 102 may intersect different types of rock but may be generally consolidated and cemented sufficiently for the borehole to remain open indefinitely. The borehole may encounter multiple aquifers 106, 110 separated by aquitards 108 present in the bedrock. Though two aquifers 106, 110 and one aquitard 108 are shown, it should be appreciated that aspects of the present invention can be implemented in connection with any number of aquifers and aquitards.

In many embodiments, the ground heat exchanger 100 can include an inner tube 140 may then be inserted coaxially into the borehole 102. The inner tube 140 may be made of a sufficiently rigid material so as not to collapse with time. The top and bottom ends of the inner tube may be open. In many embodiments, the bottom end of the inner tube may include a screen or filtration mechanism 170.

In use, the ground heat exchanger 100 may be operated by the liquid supply system 120 directing fluid (e.g., water) down through top end of the annulus 152 between the inner tube 140 and the borehole 102, indicated by the direction "d", into the inner tube 140 through the open bottom end, and back up the inside of the inner tube 140, indicated by direction "c", and receive the fluid back from the top end of the inner tube 140. Thus, the fluid flow through the inner tube 140 is coaxial with the borehole 102. The fluid may exchange heat with the surrounding geologic units as it travels down the annulus 152. As the fluid enters the bottom end of the inner tube 140, it can pass through the screen or filtration equipment 170, thereby preventing foreign matter from entering the heating/cooling equipment 120. The inner tube 140 may be constructed of a material with a relatively high thermal resistance to inhibit heat transfer between fluid flowing up through the inner tube 140 and fluid flowing down through the annulus 152. In some embodiments, the liquid supply system 120 can direct fluid in the opposite direction—down through the inner tube 140 and back up through the annulus 152, permitting heat exchange between the fluid and the surrounding geologic units when the fluid is on its way back up to the liquid supply system 120.

The profile of the borehole can vary based on geographic region. In some regions (e.g., the New England area), there are very few fractures in the bedrock, which is generally tight or impermeable, meaning that only meager amounts of water tend to enter the borehole 102. In contrast, in some regions (e.g., the Midwest), a borehole may encounter multiple different aquitards 108 and/or aquifers 106, 110, which may introduce large amounts of water to the borehole 102 in a direction indicated by "b".

In conventional open-loop standing column wells such as the embodiment illustrated FIG. 1, as the fluid travels down through the annulus 152, it may mix with fluid from the surrounding geologic units (e.g., underground water at a water level 104 shown in FIG. 1) in directions indicated by "a" and "b". Thus, the fluid that leaves the liquid supply system 120 is not necessarily the same fluid that returns to the liquid supply system 120. In regions with minimal underground water, the mixing may be minimal. In other regions, such as those with one or more aquifers 106, 110 at different depths separated by an aquitard 108, mixing may be very significant. Filtration and the liquid's chemical composition can become important issues with such mixing, which can lead to premature wear and/or plugging of the ground heat exchanger. When a borehole 102 encounters multiple aquifers 106, 110 at different depths separated by an aquitard 108, an open-loop standing column well can allow the aquifers 106, 110 to interconnect, as shown by the arrow 130. In many instances, regulations prohibit the interconnection of aquifers.

Figure 2:
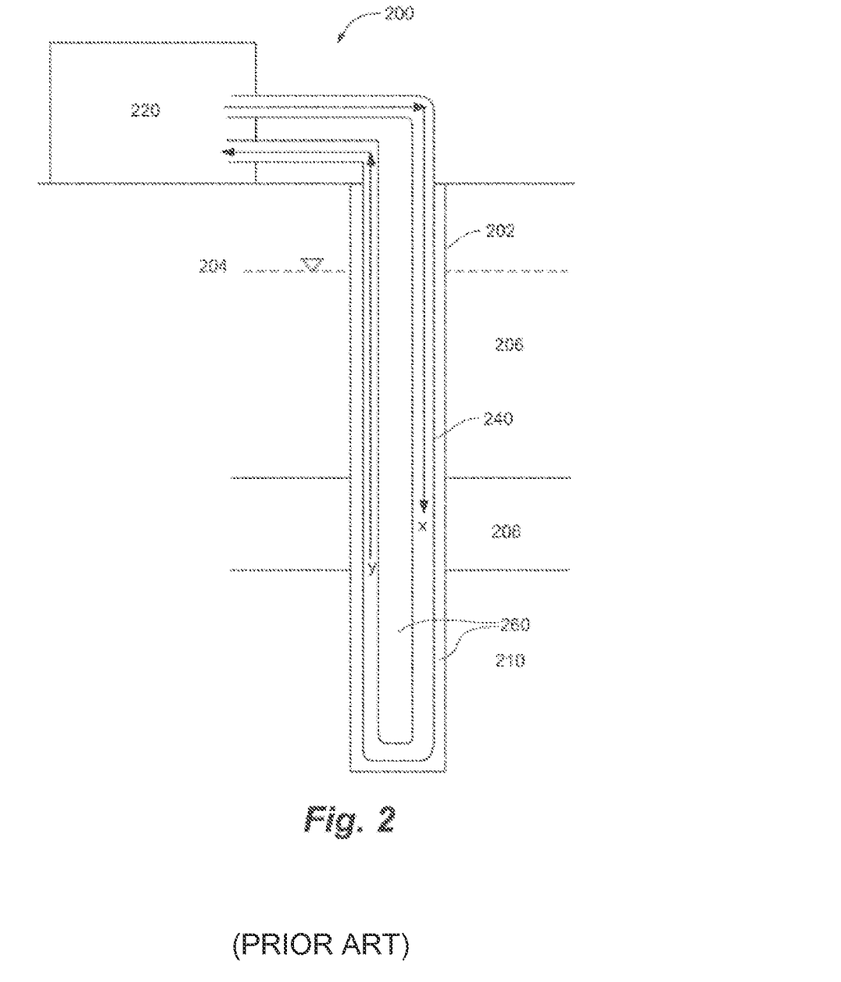
FIG. 2 is a schematic diagram of a conventional closed-loop, U-shaped tube ground heat exchanger.

Other ground heat exchangers may have a closed-loop configuration. FIG. 2 shows a closed-loop ground heat exchanger 200 that includes a U-shaped inner tube 240 that is placed coaxially inside a borehole 202. A liquid supply system 220, such as those discussed elsewhere herein, can supply a fluid downwardly as indicated by direction "x" through the inner tube 240 and receives fluid from of the inner tube 240 in a direction "y". Heat transfer can occur as the fluid flows through the inner tube 240 along "x" and "y" directions. An advantage of some closed-loop configurations is that no external fluid (e.g., fluid at fluid level 204 shown in FIG. 2) is introduced to the system, meaning that filtration is not necessary. In addition, in some embodiments, inhibitors and/or antifreeze may be added to the fluid to enhance heat transfer without such inhibitors and/or antifreeze mixing with the underground water. A filler material 260 such as cement, bentonite grout, or similar materials may be filled around the tube to prevent aquifers 206, 210 from interconnecting through the aquitard 208. Though two aquifers 206, 210 and one aquitard 208 are shown, it should be appreciated that aspects of the present invention can be implemented in connection with any number of aquifers and aquitards. In some embodiments, such a U-shaped inner tube 240 can require a larger diameter bore hole 202, which can be disadvantageous in some circumstances.

Figure 3:
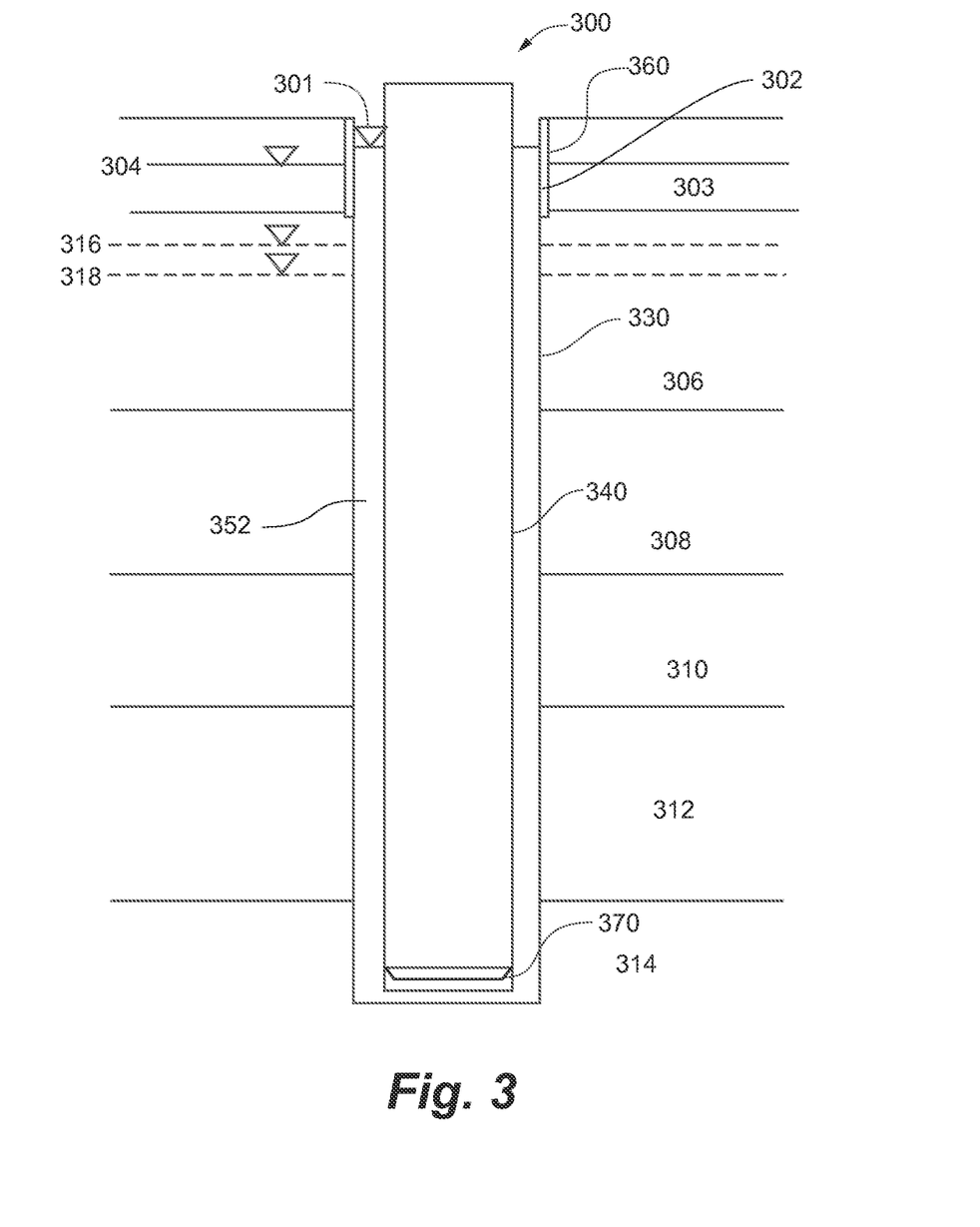
FIG. 3 is a schematic diagram of a closed-loop, coaxial flow ground heat exchanger according to embodiments of the present invention.

FIG. 3 shows a coaxial-flow, closed loop ground heat exchanger 300 in accordance with some embodiments of the present invention. A borehole 302 may be drilled into the overburden 303. The diameter of the borehole 302 can be between roughly six inches and roughly 18 inches. Smaller diameter boreholes can generally be less expensive. In some instances, though, it can be difficult to fit equipment e.g., the outer liner 330 and/or the inner tube 340) into a smaller diameter borehole. In some instances, it can be easier to drill to desired depths with a larger borehole diameter. In some instances, increasing the borehole diameter beyond approximately 18 inches may add significant cost without providing additional benefit of increased heat transfer surface area. In some embodiments, a casing 360 may be placed in the overburden 303. As is the case with the ground heat exchanger 100 shown in FIG. 1, bottom end of the inner tube 340 may include a screen or filtration mechanism 370.

In some embodiments, once the borehole 302 is drilled, an outer liner 330 may be installed inside the borehole. The outer liner 330 can include a substantially liquid-impermeable fabric. In some instances, the outer liner 330 can include one or more layers of substantially liquid-impermeable fabric. In some embodiments, the outer liner 330 can include multiple layers of liner membrane. In some embodiments, the outer liner 330 can include a substantially liquid-impermeable coating. Illustrative constructions include a fabric layer, such as nylon, polyester, etc., coated with a coating, such as urethane, PVC, etc. The bottom end of the outer liner 330 may be sealed, thereby completely isolating the interior of the outer liner 330 from the surrounding geologic units. The top end of the outer liner 330 may be at or near the ground surface and may be open.

Figure 4:
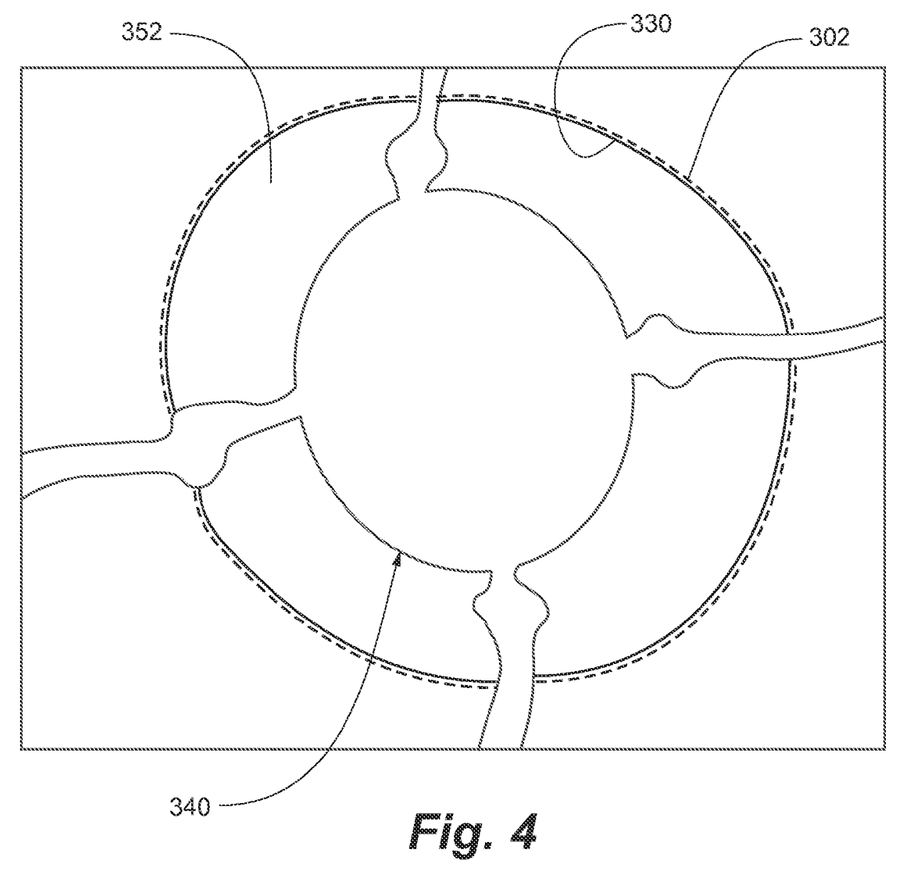
FIG. 4 is a schematic end view diagram showing a closer view of a liner sealing against a borehole wall in accordance with embodiments of the present invention.
Figure 5:
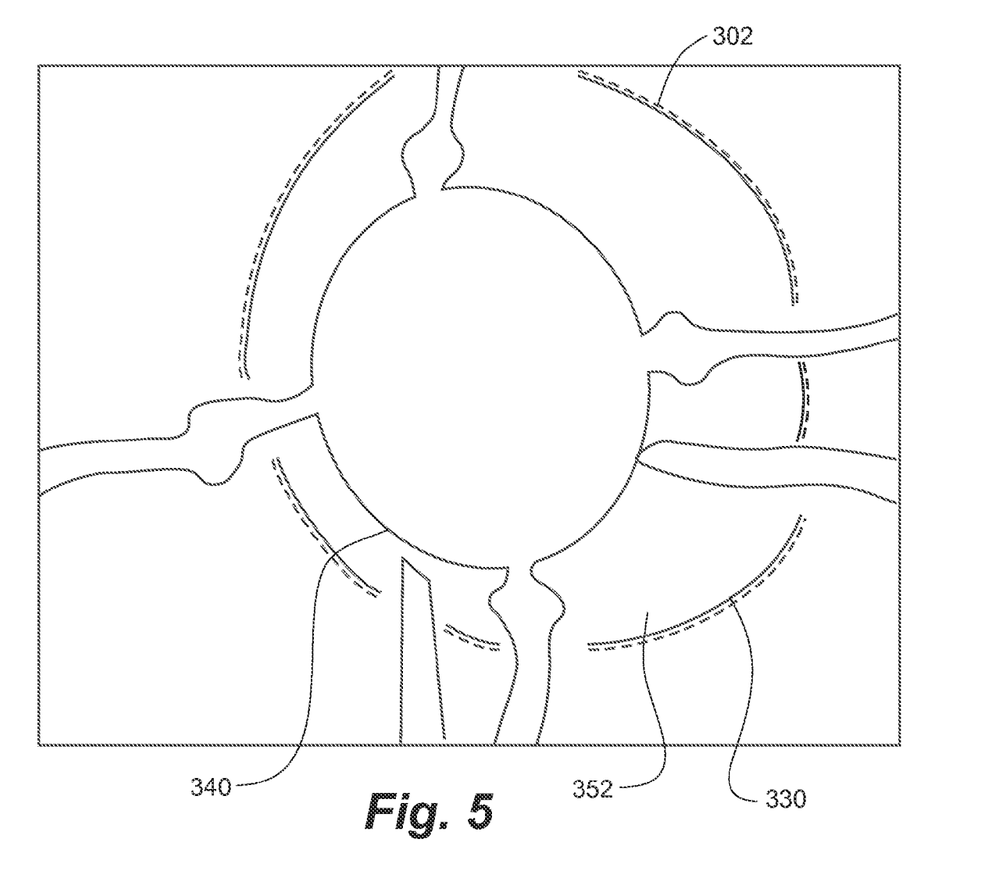
FIG. 5 is a schematic end view diagram showing a closer view of a liner sealing against a borehole wall in accordance with embodiments of the present invention.

With the outer liner 330 in place, an inner tube 340 like the one discussed above may be placed co-axially inside the outer liner 330. FIGS. 4 and 5 show a schematic end view when the inner tube 340 is being installed coaxially inside the outer liner 330. In many embodiments, the diameter of the inner tube 340 may be between roughly three inches and roughly 15 inches. Embodiments like the one shown in FIG. 3 may be especially suitable for locations with bedrock 303 near the surface (e.g., most of the unglaciated United States) or where the borehole 302 encounters multiple aquifers 306, 310, 314 separated by multiple aquitards 308, 312 (e.g., most of the United States underlain by sedimentary and metasedimentary rock units) or where the aquifers encountered by the borehole 302 may have large openings within them e.g., most of the United States underlain by carbonate rock units). Though three aquifers 306, 310, 314 and two aquitards 308, 312 are shown, it should be appreciated that aspects of the present invention can be implemented in connection with any number of aquifers and aquitards.

A liquid supply system, such as those discussed elsewhere herein, can supply a fluid (e.g., water with or without a heat-transfer-enhancement fluid) for heat exchange with the surrounding geologic units. In many embodiments, the liquid supply system provides fluid so that it travels downwardly through an annulus 352 between the outer liner 330 and the inner tube 340. The fluid can then travel back upwardly within the inner tube 340 and back to the liquid supply system. In some embodiments, the liquid supply system provides fluid so that it travels downwardly within the inner tube 340 and then back upwardly through the annulus 352 between the outer liner 330 and the inner tube 340 to the liquid supply system. Heat exchange can occur between the fluid traveling through the annulus 352 and the surrounding geologic units.

In many embodiments, the size of the annulus 352—or the difference between the radius of the borehole 302 and the radius of the inner tube 340—may be sized for maximum heat transfer between the fluid traveling through the annulus 352 and the surrounding geologic units. In some embodiments, the size of the annulus 352 can be between roughly one inch and roughly two inches. In can be advantageous to encourage each unit of fluid (or as much fluid as possible) traveling through the annulus 352 to exchange heat with the surrounding geologic units. The fluid traveling through the annulus 352 can travel at a higher rate than fluid traveling through the inner tube 340. In some embodiments, a very small annulus 352 (e.g., less than one inch) can be advantageous in facilitating optimum heat transfer.

In some embodiments, the fluid traveling through the annulus presses the outer liner 330 radially outwardly into sealing contact with the borehole 302. The fluid exerts hydraulic force in a radially outward direction on the outer liner 330 such that the hydraulic force of the fluid (e.g., at a fluid level 301) inside the outer liner 330 is not exceeded by any radially inwardly directed force from fluids (e.g., at fluid levels 304, 316, 318) in the surrounding geologic units. In this manner the outer liner 330 may be pressed firmly against the wall of the borehole 302 (see FIGS. 4-6). The outer liner 330 can be constructed to withstand pressure differentials likely to be present at various depths in the borehole 302. For example, if the maximum radially inwardly directed pressure exerted by the surrounding geologic units is at a first depth, the radially outwardly directed pressure maintained in the annulus 352 can be controlled to create a proper seal between the outer liner 330 and the surrounding geologic units at the first depth. But if the radially inwardly directed pressure exerted by the surrounding geologic units at a second depth is significantly different than at the first depth, the outer liner may experience a significant pressure differential at the second depth. The outer liner 330 may have a service test strength that accommodates such pressure differentials along the depth of the borehole 302. In some embodiments, the largest pressure differential along the depth of the borehole 302 may be roughly 90% of the service test strength of the outer liner 330.

Figure 6:
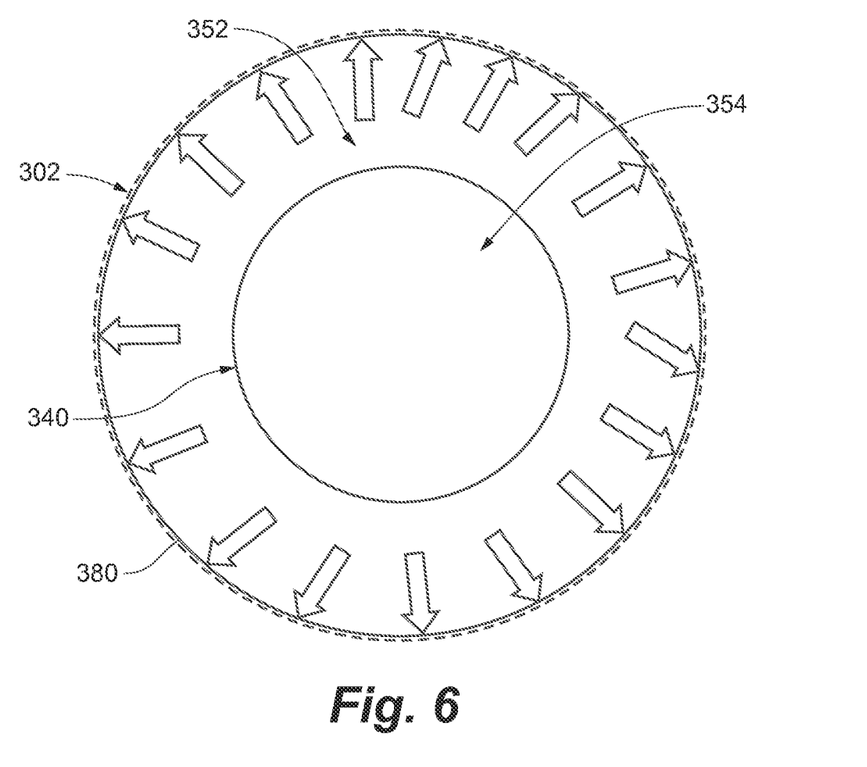
FIG. 6 is a schematic end view of a closed-loop, coaxial flow ground heat exchanger in accordance with embodiments of the present invention.

Such a system may operate as a closed-loop in that the outer liner 330 may prevent mixture between fluid traveling through the annulus 352 and fluid from the surrounding geologic units. The fluid traveling through the annulus 352 can press the outer liner 352 in a radially-outward direction with a hydraulic force, as shown in FIG. 6 that is not exceeded by any radially-inward directed force from fluids in the surrounding geologic units. In this way, the outer liner 352 may be pressed into the cracks and crevices in the borehole wall to create an effective seal, thereby preventing aquifer interconnection across aquitards. The fabric and coating materials of the outer liner 330 may resist and prevent water migrating through the outer liner 330, and yet be flexible, allowing the outer liner 330 to conform very closely to the surface of the borehole 302. The combination of the liner's waterproof properties, the liner's flexibility, and the higher pressures maintained inside the liner can facilitate a very tight seal against the borehole wall. In some embodiments, inhibitors and/or antifreeze may be added to the ground heat exchanger, thereby enhancing ground heat exchange.

Figure 7:
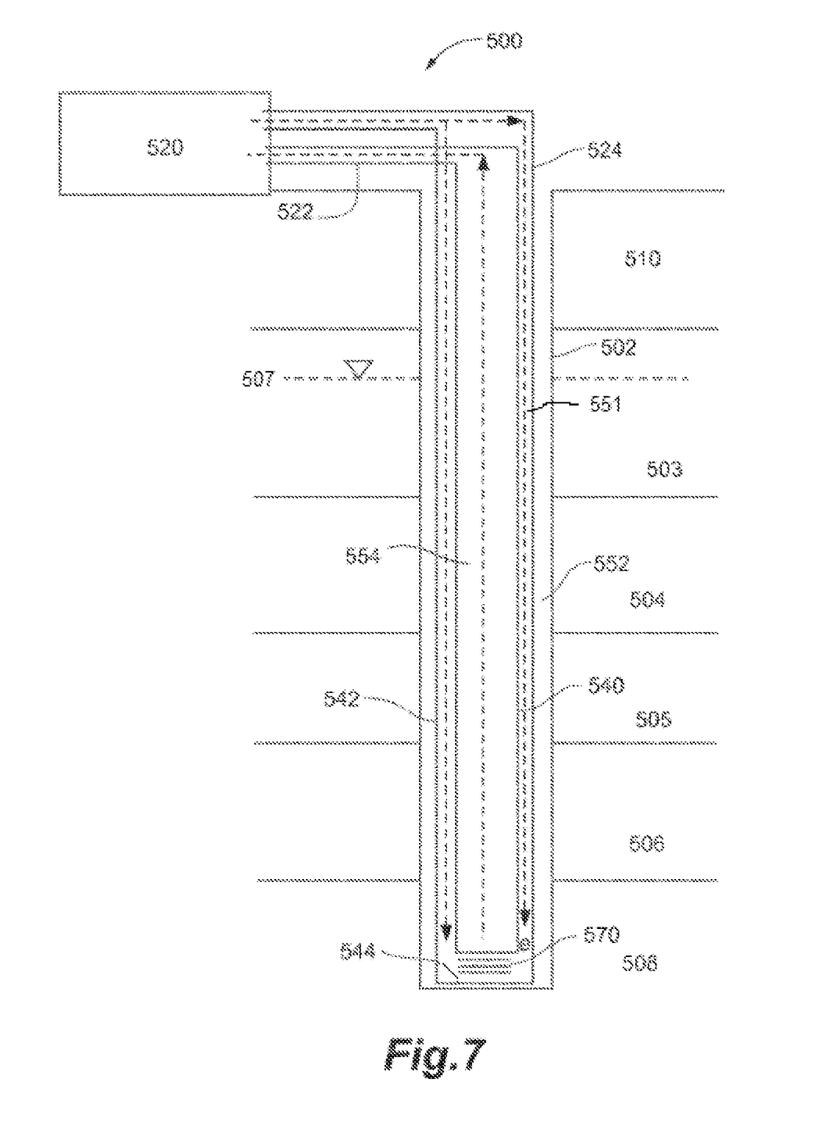
FIG. 7 is a schematic diagram of a closed-loop, coaxial flow ground heat exchanger according to embodiments of the present invention.

FIG. 7 shows a coaxial-flow, closed loop ground heat exchanger 500 in accordance with some embodiments of the present invention. In some embodiments, once the borehole 502 is drilled, an outer tube 542 may be installed inside the borehole 502 in a geologic unit 510. The outer tube 542 may be comprised of a polymeric material (e.g., plastic) that is sufficiently rigid to not collapse with time. The annulus 552 between the outer tube 542 and the borehole 502 may be filled with cement, bentonite grout, or similar material. The bottom end 544 of the outer tube 542 may be sealed by a means known in the arts, such as heat fusion sealing. The top end of the outer tube may be at or near the ground surface. An inner tube 540 is placed co-axially inside the outer tube 542. The bottom end of the inner tube 540 may include a filtration mechanism 570. Embodiments like the one shown in FIG. 7 may broaden the applicability of the closed-loop, coaxial flow ground heat exchanger to locations that have thick layers of unconsolidated geologic materials having fluid at fluid level 507 overlying bedrock, with multiple aquifers 503, 505, 508 and aquitards 504, 506. Such areas include locations with glacial drift deposits (e.g., New England and the Midwest), or with thick weathering deposits (e.g., regolith in the Piedmont and southern Appalachian area), or where bedrock is not well cemented or lithified (e.g., West Coast and Great Plains areas).

In some embodiments, the top end of the outer tube 542 may be mechanically capped with a cap to enable redirection of flow from horizontal to vertical. For example, the cap may be configured to receive a fluid from a liquid supply system 520, such as those discussed elsewhere herein, to the ground heat exchanger 500. A first pipe attachment 524 may be included with the cap to redirect flow from the liquid supply system 520 into the annulus 551 between the inner and outer tubes 540 and 542 in a downward direction, indicated as "e" in FIG. 7. A second pipe attachment 522 may be included with the cap to redirect the flow from the annulus 551 within an area 554 of the inner tube 540 in an upward direction "f", back into the liquid supply system 520. In some embodiments, the cap may be designed to hold pressure and enable the inner tube 540 to extend through it, thereby isolating the flow travelling down the outer tube 542 from the flow travelling up the inner tube 540. The cap may include mechanical adapter flanges that enable removal and maintenance of the inner tube 540. The inside of the inner tube 540 may be filled with heat transfer fluid to the top of the ground heat exchanger.

Embodiments of the present invention can provide a variety of advantages. For example, embodiments of the present invention can prevent interconnection of aquifers. The closed-loop configuration can permit very efficient heat exchange. Ground heat exchange systems that comprise an outer liner made of a substantially liquid-impermeable fabric may not need filler material such as cement or bentonite grout to prevent interconnection of aquifers. Materials such as cement and bentonite grout are often thermally insulating and inhibit effective heat exchange between geologic units and the fluid traveling downward through the annulus between the inner tube and the outer liner. In some embodiments, the absence of filler material may prevent its migration into the aquifers that the borehole intersects, thereby preventing the plugging of the aquifers' permeable features, which can detract from the aquifer functioning as a water supply in the vicinity of the borehole. In some embodiments, the higher efficiency of the invention allows its application as a heating/cooling source to use fewer boreholes.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims.

What is claimed is:

1. A geothermal well system comprising:
   (a) a geothermal well that includes:
      (i) an inner tube positioned in a borehole in geologic units, the inner tube being coaxial with the borehole at each depth of the inner tube, and
      (ii) an outer liner positioned coaxially in the borehole between the inner tube and the borehole, the outer liner having a sealed bottom and being substantially liquid-impermeable; and
   (b) a liquid supply system connected to the geothermal well, the liquid supply system configured to supply liquid directly to an annulus defined between the inner tube and the outer liner to generate a radially-outwardly directed hydraulic force, between the inner tube and the outer liner, that is not exceeded by a radially inwardly directed force from fluids in the geologic units to press the outer liner radially outwardly into sealing contact with the borehole in a manner that substantially prevents interconnection of aquifers.

2. The geothermal well system of claim 1, wherein the outer liner comprises a substantially liquid-impermeable fabric.

3. The geothermal well system of claim 1, wherein the outer liner comprises multiple layers of liner membrane.

4. The geothermal well system of claim 1, wherein the outer liner comprises a substantially liquid-impermeable coating.

5. The geothermal well system of claim 1, wherein the liquid supplied by the liquid supply system to the geothermal well comprises water.

6. The geothermal well system of claim 1, wherein the liquid supply system is configured to supply liquid downwardly between the inner tube and the outer liner and to receive liquid upwardly from the inner tube.

7. The geothermal well system of claim 1, wherein the liquid supply system comprises a heating/cooling system.

8. The geothermal well system of claim 1, wherein the inner tube and the outer liner extend at least 50 feet below ground level.

9. The geothermal well system of claim 1, further comprising a filtration mechanism on a lower end of the inner tube.

10. The geothermal well of claim 1, wherein the inner tube is substantially thermally insulative to inhibit heat transfer between liquid flowing downwardly from the liquid supply system and liquid flowing upwardly towards the liquid supply system.

11. A method of operating a geothermal well system, comprising:
   (a) providing a geothermal well that includes:
      (i) an inner tube positioned in a borehole in geologic units, the inner tube being coaxial with the borehole at each depth of the inner tube, and
      (ii) an outer liner positioned coaxially in the borehole between the inner tube and the borehole, the outer liner having a sealed bottom and being substantially liquid-impermeable;
   (b) supplying liquid directly to an annulus defined between the inner tube and the outer liner to generate a radially-outwardly directed hydraulic force, the inner tube and the outer liner, that is not exceeded by a radially inwardly directed force from the geologic units to press the outer liner radially outwardly into sealing contact with the borehole in a manner that substantially prevents interconnection of aquifers; and
   (c) receiving liquid from the geothermal well.

12. The method of claim 11, wherein the outer liner comprises a substantially liquid-impermeable fabric.

13. The method of claim 11, wherein the outer liner comprises multiple layers of liner membrane.

14. The method of claim 11, wherein the outer liner comprises a substantially liquid-impermeable coating.

15. The method of claim 11, wherein the liquid supplied to the geothermal well comprises water.

16. The method of claim 11, wherein supplying liquid to the geothermal well comprises supplying liquid downwardly between the inner tube and the outer liner, and receiving liquid from the geothermal well comprises receiving liquid upwardly from the inner tube.

17. The method of claim 11, wherein supplying liquid to the geothermal well comprises supplying liquid from a heating/cooling system, and receiving liquid from the geothermal well comprises receiving liquid with the heating/cooling system.

18. The method of claim 11, wherein the inner tube and the outer liner extend at least 50 feet below ground level.

19. The method of claim 11, wherein the geothermal well further includes a filtration mechanism on a lower end of the inner tube.

20. The method of claim 11, wherein the inner tube is substantially thermally insulative to inhibit heat transfer between liquid supplied to the geothermal well and liquid to be received from the geothermal well.

* * * * *